United States Patent [19]

Contoyonis

[11] Patent Number: 4,643,055
[45] Date of Patent: Feb. 17, 1987

[54] LATHE SPINDLE ASSEMBLY

[75] Inventor: Peter Contoyonis, Libertyville, Ill.

[73] Assignee: Ammco Tools, Inc., North Chicago, Ill.

[21] Appl. No.: 861,588

[22] Filed: May 9, 1986

[51] Int. Cl.$^4$ .................. B23B 5/02; B23B 19/02; B23B 31/26
[52] U.S. Cl. .................... 82/30; 51/237 R; 82/4 A; 409/233
[58] Field of Search ............ 82/4 A, 28 R, 30, 40 R; 51/217 T, 237 R; 409/233

[56] References Cited

U.S. PATENT DOCUMENTS

| | | | |
|---|---|---|---|
| 2,891,435 | 6/1959 | Billeter | 82/4 A |
| 3,540,165 | 11/1970 | Lanham | 82/4 A |
| 3,762,271 | 10/1973 | Poincenot | 409/233 |
| 3,955,471 | 5/1976 | Frazier | 409/233 |
| 3,975,984 | 8/1976 | Simmons | 409/233 |
| 4,063,488 | 12/1977 | Kagerer | 409/233 |
| 4,165,662 | 8/1979 | Besenbruch et al. | 82/4 A |
| 4,499,800 | 2/1985 | Stahl | 409/233 |
| 4,506,570 | 3/1985 | Wood et al. | 82/4 A |

*Primary Examiner*—Nicholas P. Godici
*Assistant Examiner*—Jerry Kearns
*Attorney, Agent, or Firm*—Edmond T. Patnaude

[57] ABSTRACT

A spindle assembly for a metal working lathe includes a generally cylindrical spindle body having a forward end and a rearward end and an internal bore extending longitudinally thereof. An arbor having a forward end connectable to a workpiece is insertable into the bore of the spindle body and has a rearward end provided with a first annular tapered surface. A second annular tapered surface is formed on the arbor at an intermediate position between the forward and rearward ends thereof. The forward end of the spindle body is formed with an interior annular tapered surface configured to seat against the second annular tapered surface of the arbor. A collar member is slidingly insertable within the bore of the spindle body and is formed with an interior annular tapered surface. Means are provided for biasing the collar member into engagement with the arbor when the arbor is drawn interiorly of the spindle by a draw bar, whereupon the first annular tapered surface of the arbor seats against the interior annular tapered surface of the collar and the second annular tapered surface of the arbor seats against the interior annular tapered surface of the spindle body.

8 Claims, 5 Drawing Figures

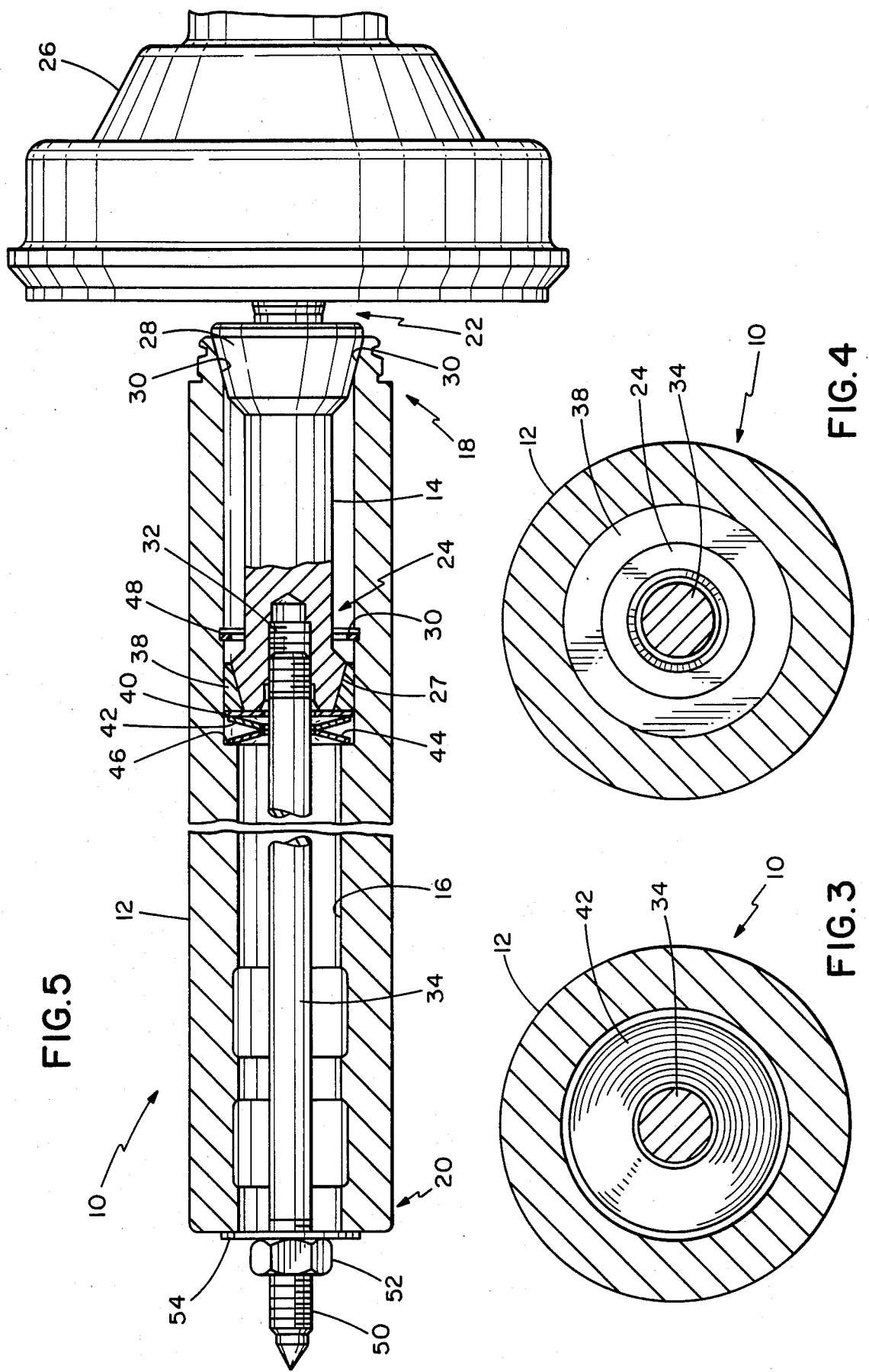

LATHE SPINDLE ASSEMBLY

BACKGROUND OF THE INVENTION

1. Field of the Invention

The present invention relates generally to an improved lathe spindle assembly for mounting a workpiece for rotation during a machining operation, and it relates more particularly to a new and improved lathe spindle assembly having the capability of self-adjusting to differing geometric tolerances of a plurality of interchangeable workpiece arbors.

2. Description of the Prior Art

A typical lathe of the general type to which the present invention relates is disclosed, for example, in U.S. Pat. No. 2,891,435 issued to H. R. Billeter, dated June 23, 1959. The aforesaid patent discloses a lathe in which a generally cylindrical spindle is rotated about its longitudinal axis and supports a workpiece during a process of machining. Such a lathe is especially well suited for the machining of automotive brake drums or rotors mounted to an arbor inserted within the lathe spindle.

In order to provide a lathe having the advantage of versatility in the machining of workpieces, it is known to construct a lathe spindle which is capable of receiving a plurality of workpiece arbors which, in turn, are specially adapted for connection to drums or rotors of various sizes and configurations. Typically, the arbors are generally elongate members having a forward end for connection to the workpiece and a rearward end which is insertable into a bore within the driven spindle of the lathe. The rearward end of the arbor is formed with a first annular tapered surface and a second annular tapered surface is formed on the arbor at a position intermediate the forward and rearward ends thereof. These surfaces are cooperable with corresponding tapered surfaces, respectively machined on the interior wall of the spindle bore. A draw bar which is threadedly received by the rearward end of each arbor is then used to draw the arbor interiorly of the driven spindle whereupon the arbor is fixedly retained within the spindle.

A disadvantage of the lathe spindle assembly of the foregoing type is that critical tolerances must be held in the machining of the tapered surfaces of the arbor and driven spindle in order to support the arbor for concentric rotation with the spindle. These critical tolerances are essential for purposes of supporting the workpiece for rotation without runout, which would cause the workpiece to rotate eccentrically thereby rendering it impossible to properly machine the workpiece surfaces. In addition, particularly where multiple spindles are used to add versatility to the lathe functions, the requirement of holding close tolerances in the fabrication of the lathe arbors adds considerably to the cost of the lathe assembly.

To overcome the foregoing disadvantages of the prior art, a lathe spindle assembly of the present invention comprises a generally cylindrical body having a forward end and a rearward end and an internal bore extending longitudinally thereof. An arbor having a forward end and a rearward end is insertable into the bore of the spindle body and carries a workpiece on the forward end thereof. The rearward end of the arbor is provided with a first annular tapered surface formed thereon. Correspondingly, a second annular tapered surface is formed on the arbor at an intermediate position between the forward and rearward ends thereof. An interior annular tapered surface is formed at the forward end of the spindle body and is configured to seat against the second annular tapered surface of the arbor. In addition, a collar member is insertable within the bore of the spindle body and is formed with an interior tapered surface configured to seat against the first annular tapered surface of the arbor. A draw bar extends through the bore of the spindle body and is threadedly received by the rearward end of the arbor for drawing the arbor interiorly of the spindle body. Means associated with the draw bar are provided for drawing the arbor interiorly of the spindle body. The assembly is further provided with means for biasing the collar member into engagement with the arbor whereupon the first annular tapered surface of the arbor seats against the interior annular tapered surface of the collar, and the second annular tapered surface of the arbor seats against the interior annular tapered surface of the spindle body. By such an arrangement, the tapered surfaces of both the spindle body and the arbor may be formed without adherence to close tolerances because the biasing means within the spindle body compresses the collar member against the arbor despite variations in the actual dimensions and longitudinal positions of the tapered surfaces of the arbor.

BRIEF DESCRIPTION OF THE DRAWINGS

The foregoing and other novel features of the present invention will be better understood by a reading of the following detailed description taken in connection with the accompanying drawings wherein:

FIG. 3 is a sectional view taken along the lines 3—3 of FIG. 1;

FIG. 4 is a sectional view taken along the lines 4—4 of FIG. 1; and

FIG. 5 is an elevational view, partially in section, illustrating the lathe spindle assembly of FIG. 1 with the arbor in a fully seated position within the lathe spindle body.

DETAILED DESCRIPTION OF THE INVENTION

Figure 1:
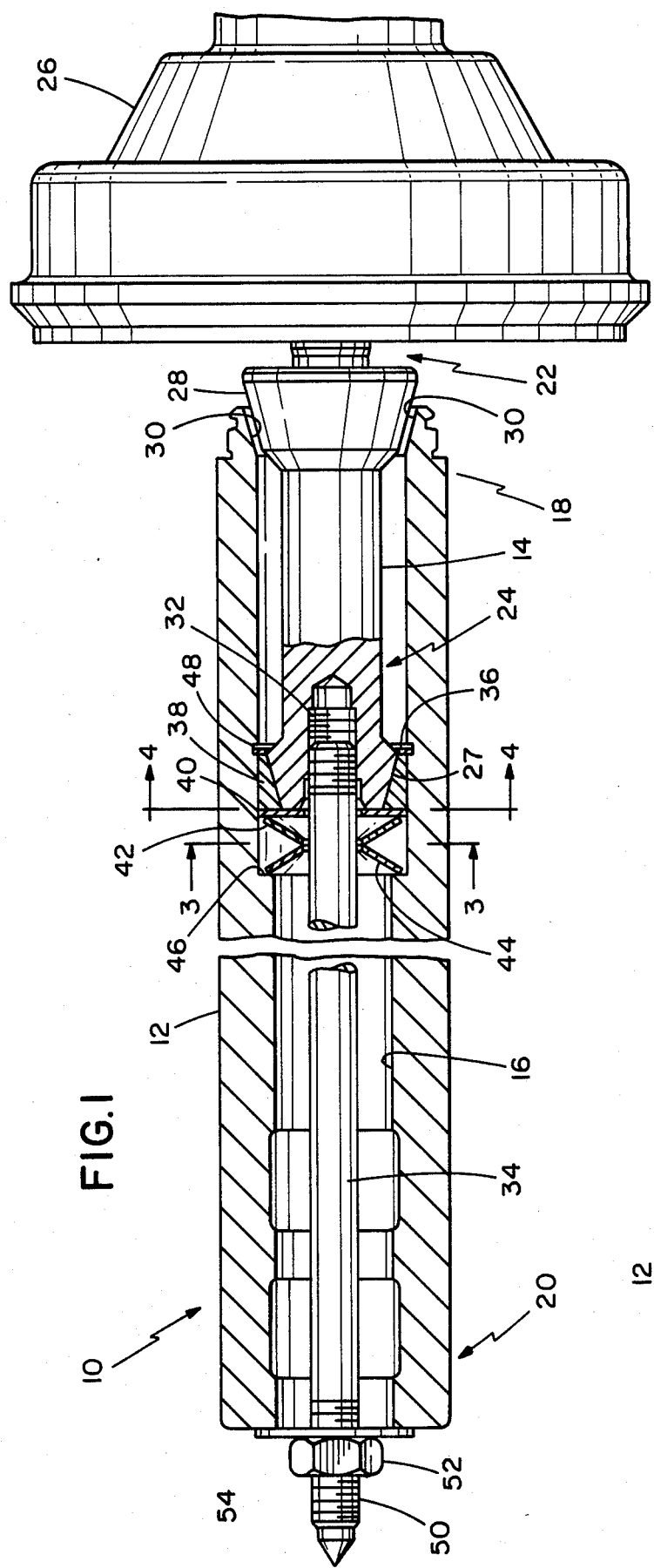
FIG. 1 is an elevational view, partially in section, of a lathe spindle assembly constructed in accordance with the principles of the invention.

Referring now to the drawings and initially to FIG. 1, there is illustrated a lathe spindle assembly constructed in accordance with the principles of the invention and designated generally by the reference numeral 10. The assembly 10 includes as its principal components a cylindrical lathe spindle body 12 which is mountable for rotation in a typical lathe (not shown) and an arbor designated generally by the reference numeral 14. The spindle body 12 is an elongate structure having an internal cylindrical bore 16 extending the length thereof and has a forward end 18 and a rearward end 20. In a manner well known in the art, the arbor 14 is also a relatively elongate member having a forward end 22 and a rearward end 24. The forward end 22 of the arbor 14 is adapted for connection to a typical brake drum 26 or other workpiece. The rearward end of the arbor 14 is provided with an annular tapered surface 27. In addition, at a position on the arbor 14 located intermediately between the forward end 22 and rearward end 24 is a second annular tapered surface 28. At the forward end 18 of the lathe spindle body 12, the internal bore 16 is slightly enlarged and formed with an interior annular surface 30 corresponding in dimensions and geometric configuration to the annular tapered surface 28 of the arbor 14. The rearward end 24 of the arbor 14 is provided with a threaded bore 32 which receives a threaded end of a draw bar 34.

Figure 2:
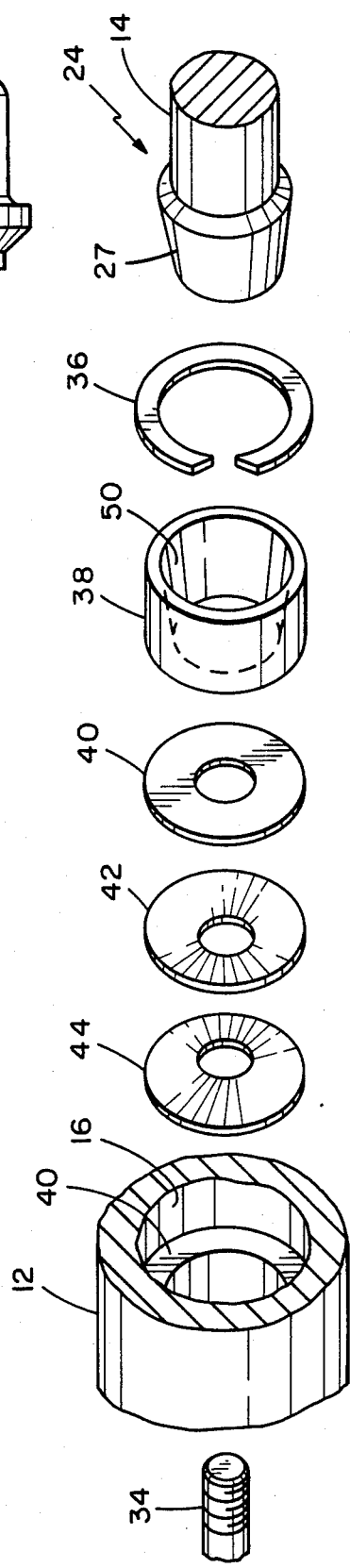
FIG. 2 is a fragmentary exploded perspective view illustrating the internal components of the lathe spindle assembly shown in FIG. 1.

Turning now to FIGS. 1, 2, 3 and 4 the internal components of the lathe spindle assembly can be seen to include a circular spring retaining clip 36, a collar member 38, a flat washer 40 and a pair of bellville springs 42 and 44. As best seen in FIG. 2, the internal bore 16 of the lathe spindle body 12 is provided with an annular shoulder 46 against which the bellville spring 44 bears. Bellville spring 42, in turn, is positioned against bellville spring 44 on one side and flat washer 40 on the other side. Collar 38 is then positioned against the flat washer 40 and the entire assembly of spring and washer components 40, 42 and 44 and the collar member 38 is retained within the bore 16 of the spindle body 12 by the retaining clip 36 which fits in a suitable groove 48 formed in the wall of the bore 16. The collar member 38 is formed with an interior annular tapered surface 50 corresponding in shape and dimension to the tapered surface 27 of the rearward end 24 of the arbor 14.

Operation

The operation of the instant invention can best be seen in FIG. 5 wherein there is shown a lathe spindle assembly 10 with the arbor 14 fully inserted within the bore 16 of the lathe spindle body 12 and in seated disposition therewithin. To affect such disposition, the draw bar 34 is provided at one end with a threaded portion 50 which receives a suitable nut 52. The nut may be drawn up against a washer 54 which, in turn, bears against the rearward end 20 of the spindle body 12. Tightening of the nut 52 draws the arbor 14 interiorly of the spindle body 12, or to the left as viewed in FIGS. 1 and 5, for example. The annular tapered surface 27 of the rearward end 24 of the arbor 14 thereby seats against the interior annular surface 50 of collar member 38 and compresses collar member 38 against the flat washer 40. The flat washer 40 thereby compresses the bellville springs 42 and 44 to a degree at which the annular tapered surface 28 of the arbor 14 comes into seated engagement with the interior annular tapered surface 30 of the forward end 18 of the lathe spindle body 12. Since the collar 38 is sized to a close fit within the bore 16 of the spindle body 12, the arbor 14, when drawn interiorly of the spindle body 12 by the draw bar 34, assumes a position within the spindle body 12 which is concentric with the axis of rotation of the spindle body 12 despite variations in dimensions and locations of the tapered surfaces 28 and 26 machined on differing arbors (not shown) which are intended to be interchangably insertable within the spindle body 12. Thus, multiple arbors 14 may be used with the lathe spindle assembly 10 to mount workpieces of differing types without run-out due to inaccuracies in the tolerances of the tapered surfaces of both the spindle body 12 and the arbor 14. It can, therefore, be appreciated that the lathe spindle assembly 10 of the instant invention offers significant advantages over prior art means for assembling an arbor within a lathe spindle body because the costs associated with maintaining critical tolerances in the machining of the arbor and spindle body are completely avoided.

While the present invention has been described in connection with particular embodiments thereof, it will be understood by those skilled in the art that many changes and modifications may be made without departing from the true spirit and scope of the present invention. Therefore it is intended by the appended claims to cover all such changes and modifications which come within the true spirit and scope of this invention.

What is claimed as new and desired to be secured under Letters patent of the United States is:

1. A lathe spindle assembly for mounting a workpiece for rotation during machining comprising:
    a generally cylindrical spindle body having a forward end and a rearward end,
    an internal bore extending longitudinally of said spindle body from the forward end to the rearward end thereof,
    an arbor having a forward end and a rearward end, said workpiece being connectable to said forward end thereof,
    a first annular tapered surface formed on said arbor at said rearward end thereof,
    a second annular tapered surface formed on said arbor intermediate said forward and rearward ends thereof and disposed in spaced relation to said first annular tapered surface,
    an interior annular tapered surface formed at the forward end of said spindle body and configured to seat against said second annular tapered surface of said arbor,
    a collar member insertable within said bore of said spindle body and having an interior tapered surface formed thereon,
    a drawbar extending through said bore and threadedly received by the rearward end of said arbor,
    means associated with said drawbar for drawing said arbor interiorly of said spindle body, and
    means for biasing said collar member into engagement with said spindle whereupon said first annular tapered surface of said arbor seats against said interior annular tapered surface of said collar and said second annular tapered surface of said arbor seats against said interior annular tapered surface of said spindle body.

2. The lathe spindle assembly of claim 1 further comprising means received within said spindle body bore for retaining said collar member within said bore.

3. The lathe spindle assembly of claim 1 further comprising means associated with said spindle body bore for counteracting the force of said biasing means against said collar.

4. The lathe spindle assembly of claim 1 wherein said means for biasing includes at least one bellville spring 5. The lathe spindle assembly of claim 2 wherein said means for retaining includes an annular retaining ring and said ring is received within a groove formed within said bore.

6. The lathe spindle assembly of claim 3 wherein said means for counteracting the force of said biasing means includes a shoulder formed on the wall of said bore.

7. The lathe spindle assembly of claim 1 wherein said means for drawing said arbor interiorly of said spindle body includes a nut threadedly received by said drawbar.

8. The lathe spindle assembly of claim 7 further including a washer in engagement with the rearward end of said spindle body, said nut being tightened against said washer to draw said arbor interiorly of said spindle.

* * * * *